United States Patent
Craig et al.

(10) Patent No.: US 7,088,847 B2
(45) Date of Patent: Aug. 8, 2006

(54) METHOD AND SYSTEM FOR ANALYZING ANIMAL DIGIT CONFORMATION

(76) Inventors: Monique F. Craig, 6720 Linne Rd., Paso Robles, CA (US) 93446; John J. Craig, 6720 Linne Rd., Paso Robles, CA (US) 93446

( * ) Notice: Subject to any disclaimer, the term of this patent is extended or adjusted under 35 U.S.C. 154(b) by 1025 days.

(21) Appl. No.: 09/900,223

(22) Filed: Jul. 6, 2001

(65) Prior Publication Data
US 2002/0037092 A1 Mar. 28, 2002

Related U.S. Application Data

(60) Provisional application No. 60/219,364, filed on Jul. 19, 2000.

(51) Int. Cl.
*G06K 9/00* (2006.01)

(52) U.S. Cl. .................... 382/110; 382/286; 168/6; 59/61

(58) Field of Classification Search ............... 382/100, 382/110, 286; 59/61; 356/603; 168/4, 24, 168/6; 348/135
See application file for complete search history.

(56) References Cited

U.S. PATENT DOCUMENTS

| | | | | |
|---|---|---|---|---|
| 4,414,546 A | * | 11/1983 | Taylor et al. ............... | 382/110 |
| 5,287,931 A | * | 2/1994 | Eriksson ...................... | 168/24 |
| 5,319,918 A | * | 6/1994 | Baur et al. ..................... | 59/61 |
| 5,368,104 A | * | 11/1994 | Duckett ......................... | 168/4 |
| 5,412,420 A | * | 5/1995 | Ellis ............................ | 348/135 |
| 5,644,643 A | * | 7/1997 | Scofield et al. ............. | 382/110 |
| 6,081,607 A | * | 6/2000 | Mori et al. .................. | 382/110 |
| 6,285,780 B1 | * | 9/2001 | Yamakita et al. ........... | 382/110 |
| 6,549,289 B1 | * | 4/2003 | Ellis ........................... | 356/603 |
| 2004/0111917 A1 | * | 6/2004 | Nichol ........................... | 36/1 |
| 2004/0146182 A1 | * | 7/2004 | Mostert et al. ............. | 382/103 |
| 2005/0018880 A1 | * | 1/2005 | Mostert et al. ............. | 382/103 |
| 2005/0177802 A1 | * | 8/2005 | Mostert ....................... | 715/840 |
| 2006/0029254 A1 | * | 2/2006 | Mostert et al. ............. | 382/103 |

* cited by examiner

*Primary Examiner*—Matthew C. Bella
*Assistant Examiner*—Barry Choobin

(57) ABSTRACT

A method for analyzing biomechanical conformation of the lower leg and hoof of animals, for example a horse, from images (photographs, radiographs, etc) is described. In particular, there is provided a method to analyze images that may include certain scale markers. A user may be guided to pick certain key points in the images, from which a special set of biomechanical parameters may be computed. Using these parameters, the conformation of the hoof and leg can be analyzed in various ways, including comparison to a database of other animals, tracking changes over time, or by means of quantitative scoring rules.

4 Claims, 10 Drawing Sheets

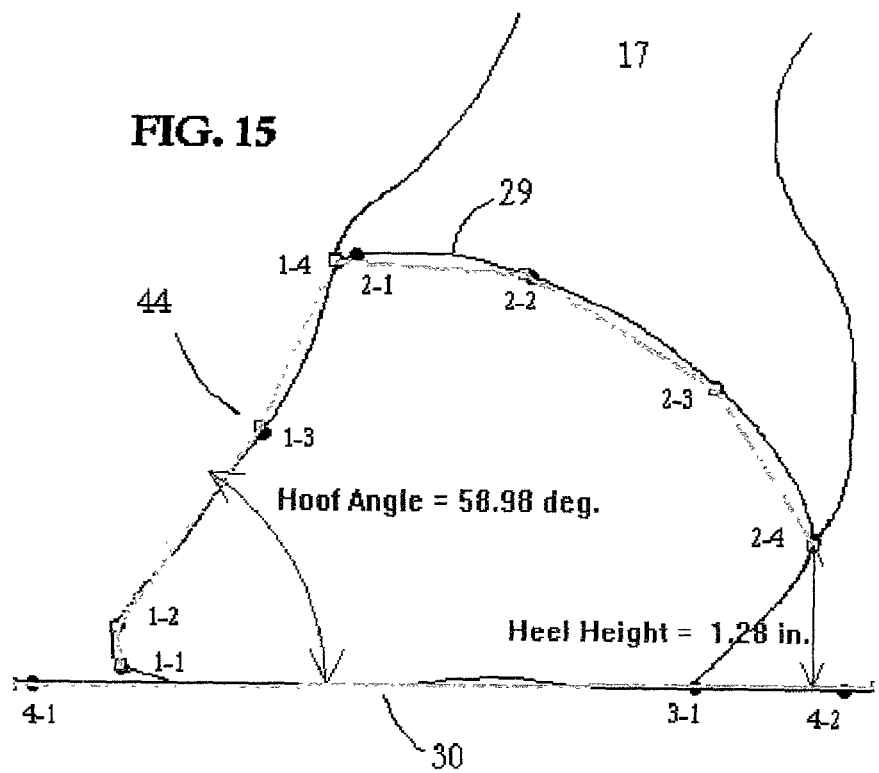
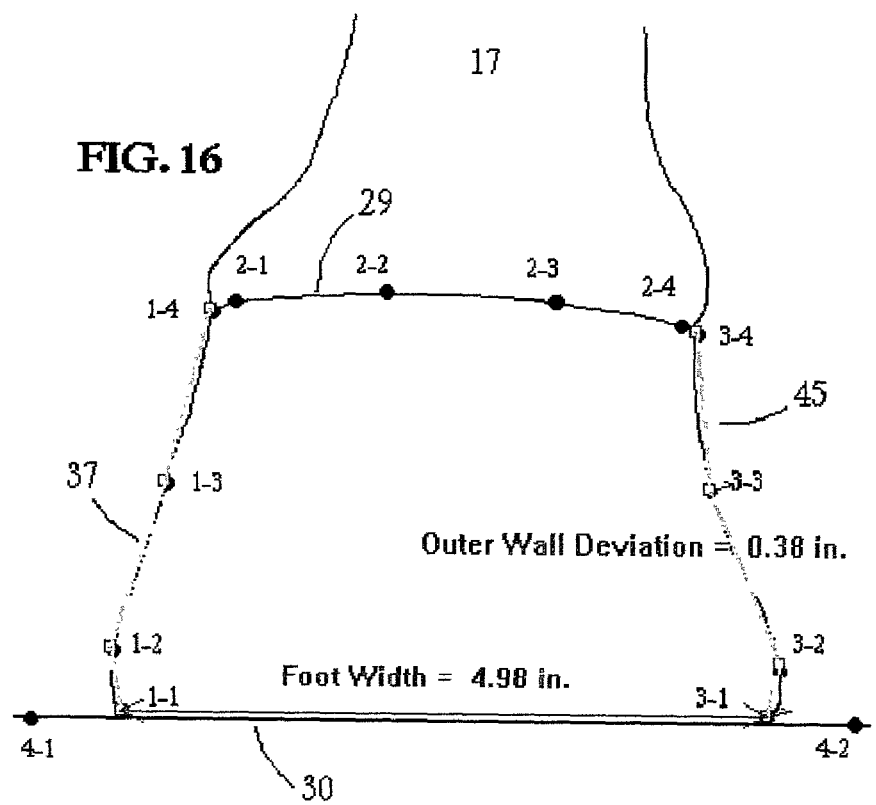

| | | | Legend: | ■ "Bone" Parameters<br>▬ "Hoof" Parameters<br>▓ "Stance" Parameters | | 51 | Compare this X-Ray to:<br>of: | Front Feet ▼<br>All Horses ▼ | |
|---|---|---|---|---|---|---|---|---|---|

| | Parameter | Value | Unit | Min | Range | Max | N |
|---|---|---|---|---|---|---|---|
| ☐ | Length of P3 | 2.30 | in. | 1.96 | ▓│▓ | 2.67 | [15] |
| ☑ | Length of P2 | 2.10 | in. | 1.79 | ▓│▓ | 2.37 | [15] |
| ☐ | Length of P1 | 4.04 | in. | 3.54 | ■■■ | 3.92 | [8] |
| ☐ | P3-Joint Radius | 0.65 | in. | 0.55 | | 0.76 | [15] |
| ☐ | P2-Joint Radius | 0.74 | in. | 0.72 | ■■■ | 1.05 | [15] |
| ☐ | P2 Min Half-Width | 0.58 | in. | 0.58 | ■■■ | 0.87 | [15] |
| ☐ | P1 Min Half-Width | 0.48 | in. | 0.43 | ▓│▓ | 0.68 | [15] |
| ☐ | Navicular Width | 1.00 | in. | 0.75 | ■■■ | 1.01 | [15] |
| ☐ | P3 Angle to Ground | 50.12 | deg. | 44.86 | ▓│▓ | 58.93 | [15] |
| ☐ | Sole Thickness | 0.38 | in. | 0.36 | ■■■ | 0.67 | [15] |
| ☐ | P3-Joint Height | 1.55 | in. | 1.37 | ▓│▓ | 2.22 | [15] |
| ☐ | Navicular Angle | 36.05 | deg. | 35.04 | ■■■ | 51.63 | [15] |
| ☐ | Support Length | 5.17 | in. | 4.72 | ▓│▓ | 6.65 | [13] |
| ☐ | Toe Support % | 61.01 | % | 59.83 | ■■■ | 69.23 | [13] |
| ☐ | Functional Hoof Ang. | 70.40 | deg. | 65.63 | ▓│▓ | 81.12 | [13] |
| ☐ | Hoof Straightness | 0.49 | in. | 0.17 | ■■■ | 0.49 | [13] |
| ☐ | Hoof Angle | 52.52 | deg. | 50.96 | ■■■ | 64.29 | [13] |
| ☐ | Front Wall Thickness | 0.91 | in. | 0.55 | ▓│▓ | 1.10 | [13] |
| ☐ | Front/P3 Angle Dif. | 2.40 | | | │ | 8.68 | [13] |
| ☐ | Toe Length | 3.84 | in. | | │ | 4.46 | [13] |
| ☐ | P3-Joint Angle | 26.90 | deg. | 11.40 | ▓│▓ | 33.35 | [15] |
| ☐ | P2-Joint Angle | 12.19 | deg. | 1.95 | ▓│▓ | 14.97 | [15] |

| Parameter Name | Value | | Best when... | Importance | |
|---|---|---|---|---|---|
| Heel Separation | 2.88 | in. | Any Value is OK | None | Edit |
| Frog Angle | 55.15 | deg. | Between 55.000 and 70.000 | Med | Edit |
| Foot Length | 5.19 | in. | Any Value is OK | None | Edit |
| Foot Width | 5.12 | | Value is | | |
| Foot Circumference | 17.01 | in. | Any Value is OK | None | Edit |
| Foot Radius | 2.71 | in. | Any Value is OK | None | Edit |
| Foot Area | 23.02 | in.2 | Any Value is OK | None | Edit |
| Toe/Length % | 60.89 | % | Between 50.000 and 60.000 | High | Edit |
| Inside/Width % | 49.49 | % | At Most 50.000 | High | Edit |
| Heel/Width % | 56.29 | % | At Least 62.500 | High | Edit |
| Heel-Bulb Distance | 1.40 | in. | Any Value is OK | None | Edit |
| Heel-Bulb/Length % | 27.22 | % | At Most 25.000 | High | Edit |
| Frog/Heel Angle | 88.60 | deg. | Equal to 90.000 | High | Edit |
| Frog/Toe Angle | 96.44 | deg. | Equal to 90.000 | High | Edit |

FIG. 18

<<Previous | Hilite Loss of 16 % or More | Score: 69.38 % | Print | Close

METHOD AND SYSTEM FOR ANALYZING ANIMAL DIGIT CONFORMATION

CROSS REFERENCE TO RELATED APPLICATION

We claim benefit of an earlier filed Provisional Application with Application No. 60/219,364 which was filed on 19, Jul. 2000

STATEMENT REGUARDING FEDERALLY SPONSORED RESEARCH OR DEVELOPMENT

Not Applicable

REFERRNCE TO A MICROFICHE APPENDIX

Not Applicable

BACKGROUND OF THE INVENTION

The present invention relates generally to image data processing, interpretation and quantification of animal digit conformation for medical diagnostic purposes and more particularly to a technique for deriving special biomechanical parameters that describe the animal digit (hoof and lower leg) from images for the purpose of comparison or scoring the conformation of the bone and hoof and their spatial relationship.

An animal hoof and especially an equine hoof is composed of a relatively hard outer surface, a sole and other structures on the ground surface of the foot. The outer surface continues to grow during the animals lifetime (similar to the human fingernail). . In the wild, the growth rate of the hoof wall is approximately balanced by the wear processes as the animal moves. However, in a domestic horse, for example, such is not the case. Due to the use we humans make of the horse and the surfaces and conditions they are kept in, some 'artificial' treatment of the hoof is generally required. Most generally, a farrier will trim the hoof and apply a metal shoe to protect the foot. In some situations, shoes are not required, but nevertheless it may be important to trim the outer shape of the hoof from time to time.

When the farrier trims the outer shape of the hoof, a large number of choices can be made concerning what the optimal shape of the hoof might be. Over the years, a great many theories, methodologies, and opinions concerning the best shape of the hoof have been and continue to be espoused. It is generally agreed that various angles, distances, thicknesses, and other measures of the hoof shape dramatically affect the motion, comfort, and, ultimately, health of the animal such as a horse. In perhaps a somewhat typical current practice, a farrier attends to a horse about every 6 weeks. The old shoes are removed, the hoofs are trimmed, and new shoes are placed on the feet.

A typical situation for domestic horse is that the 'toe' portion of the hoof grows out more quickly than the 'heel' portion of the hoof, and hence, without periodic trimming, the angle the foot makes with the ground (as seen from a side view) would gradually change. However, a great variety of other situations concerning the shape and growth of the hoof occur, and it is the job of the farrier, sometimes with a veterinarian's advice, to determine the best course of action to maintain the health and usefulness of the horse. The use of radiographs is typical in the diagnosis of lameness problems in animals, for example, horses. Many veterinarians employ portable X-ray machines in their practice.

Generally, the veterinarian takes several radiographs of a horse as part of a "pre-purchase" check-up when horses are purchased. While radiographs of all parts of the horse may be taken, there is a strong concentration in the area of the feet and lower legs. A typical radiographic study of a single foot may comprise five or more separate 'views' of the foot. By 'view', it is meant a certain positioning of the X-ray emitting machine and X-ray sensitive film. A radiograph of the equine foot from any of these views will show bone structures interior to the foot, and will often (depending on details of exposure lengths and X-ray intensity) also show the shape of the hoof wall.

Often radiographs are employed to look for problems such as bone fractures, loss of bone, addition of bone (calcifications), lesions, and other pathologies. Another use of radiographs is in looking for various physical measurements such as the thickness of the sole of the foot, the thickness of the hoof wall, the angle that a certain bone makes relative to the hoof wall, and so on. However, these radiographs are generally 'unscaled' so that physical measurements of length are uncalibrated and only approximate.

Due to the typical apparatus used in taking radiographs, interpreting the true lengths of features in the image is non-trivial. Because the X-ray generator is essentially a point-source of X-rays, and because the X-ray sensitive film is placed on the opposite side of the subject from the X-ray source, a 'magnification' effect is apparent in radiographs. That is, the image of an object in a radiograph is larger than the actual object. The exact value of this magnification effect depends upon placement of the X-ray source relative to the subject and to the X-ray sensitive film. Radiographs also display a certain form of distortion due to the fact that the X-rays are in the form of diverging rays from a point-source and due to the fact that the subject is not 'thin' but generally has significant depth in the direction aligned with the X-rays. This distortion is minimal near the center of the radiograph (towards which the X-ray beam was pointed) and is maximal near the outer edges of the radiograph. For this reason, veterinarians use the practice of centering the most important item in the radiograph's field of view.

A radiograph can be extremely helpful to a farrier, as the extent to which a hoof can and should be trimmed has a relationship with thickness of the hoof wall and sole, and the location of the bones of the equine digit. Because a good radiograph shows these elements, it can be invaluable as a guide to trimming the hoof. The expense of radiographs generally prohibits their use with every routine trimming, but in horses with particular problems, or those of particular value, radiographs are sometimes taken in association with a visit by the farrier to trim the hoof. As an alternative or in addition to radiographs, photographs may also be employed to record the state of the exterior shape of the hoof. Side view, front view, and solar view photographs will show many important angles and lengths which, when taken together, describe the conformation of the hoof. Again, such images are generally unscaled, so that deriving length measurements from them is difficult.

Similarly, in addition to radiographs and photographs, other imaging techniques can and are used to record and study the conformation of horses and other animals. Such techniques include MRI scans, CAT scans, ultrasound imaging, thermography, and others. Both X-ray machines and cameras (for photography) are undergoing rapid technological change from analog devices to inherently digital devices. In either case, it is now possible to obtain a digital image. The digital image may be produced directly by the camera, or obtained in a second step by 'scanning' the image with some kind of optical device, which can then output a digital image.

Thus, there is a need for the direct comparison in a numerical, quantitative sense between two animals such as two horses, or between one animal and a set of other like animals. There is also a need for the direct quantitative tracking of change for a given animal such as a horse over time. Finally, there is a need for the ability to summarize the overall conformation of the animal hoof and leg in the form of a single quantitative score in a well-defined way.

Therefore, it would be desirable to have images that are "scaled", whereby these quantified and calibrated images may be compared to a predetermined database of certain information and checked against a rules based database to determine the initial physicality of a given subject. It would be further desirable to reference this data in order to compare and determine the progression of that particular subject's condition.

BRIEF SUMMARY OF THE INVENTION

In accordance with one aspect of the present invention, there is provided a method and system for computing a set of parameters which may be obtained from images of an animal's hoof and leg. These parameters are then used to form a description of the biomechanical conformation of the hoof and leg. Preferably, this aspect includes databasing, change-tracking, comparison, and scoring of equine hoof and leg conformation.

In a preferred embodiment, there is provided a method and system comprised of providing images of animal hoofs and legs, including scale markers in the images, picking key points in these scaled images, defining parameters suitable for describing conformation adequately and repeatably, computing these parameters, displaying these parameters, comparing the parameters of one animal to a sample set of other like animals, 'scoring' a single animal to derive a single quantitative score relative to stated criteria, and transmitting, adding comments and mark-ups to these images and data.

In a most preferred embodiment, there is provided a method and system for obtaining a quantitative set of numerical parameters which describe a given horse. For each type of image, radiographic or photographic, and for each of several views of the hoof and leg (e.g., lateral, frontal, solar) there is a specific set of parameters defined. Hence, the method defines many sets of parameters, one set per type of image and viewing angle. The sum total of these parameters gives a rather complete numerical description of the external (and in some cases, internal) shape and structure of the hoof and lower leg.

In another aspect of the present invention, there is provided a means, based on the quantitative parameters, to compare horses. A preferred embodiment comprises a method and system for studying how a given horse compares with a set of other horses (e.g., the 'comparison set'). This can be of value in judging if a given horse is of 'normal' conformation, where normal is defined by the average of the parameters derived from a comparison set of horses. This comparison set may be comprised, for example, of horses previously know to excel at some particular use.

In yet another aspect of the present invention, there is provided a method and system for obtaining comparison of quantitative measures of a given horse over time, in order to track changes. It can be important to watch for changes in conformation which may indicate developing problems, or track changes which may signify a gradual improvement in the horse's performance, comfort, and overall health.

In yet another aspect of the present invention, there is provided a method and system for obtaining a quantitative 'score' to be computed for each view of each hoof or leg, and to composite these scores together into a single 'score' for the entire horse. Because there are so many competing theories and opinions regarding what are the important aspects of hoof and leg conformation, a preferred embodiment of this aspect of the present invention comprises a scoring scheme that can be easily modified by individual users to compute a score based on any given set of parameters. In addition to this flexibility for other users to customize the scoring rule, a more preferred embodiment also specifies one or more rules to be used with each different image type and view. Other advantages and features of the present invention will become apparent from the following specification when taken in conjunction with the accompanying drawings.

BRIEF DESCRIPTION OF THE DRAWINGS

FIG. 15 is a schematic of an example of some of the biomechanical parameters computed from the Guided-Mark-Up picks. A preferred embodiment of the method computes a total of 7 parameters for the lateral hoof photograph, while this schematic drawing only shows two as an example;

FIG. 16 is a schematic of an example of some of the biomechanical parameters computed from the Guided-Mark-Up picks. A preferred embodiment of the method computes a total of 8 parameters for the frontal hoof photograph, while this schematic drawing only shows two as an example;

FIG. 17 shows an example of the display of parameter values as well as a comparison to a set of other horses. One method of display for the comparison is shown: the minimum and maximum value found in the sample set is displayed, and that value of the horse being compared is indicated by a vertical bar. This allows for quick visualization of how each parameter value of the current horse compares to others in a chosen comparison group; and FIG. 18 shows an example of the display for scoring a set of parameters derived from a particular image type and view. For each parameter, the user of the system can indicate a preferred value or range of values. By specifying various weighting function values, the user's preferences are translated into a numerical score for the image. These preferences are described by simple terms such as "at least X", or "at most X", or "equal to X", or "between X and Y", where the values of X and Y can be specified in various ways by the user of the system.

DETAILED DESCRIPTION OF THE INVENTION

Figure 1:
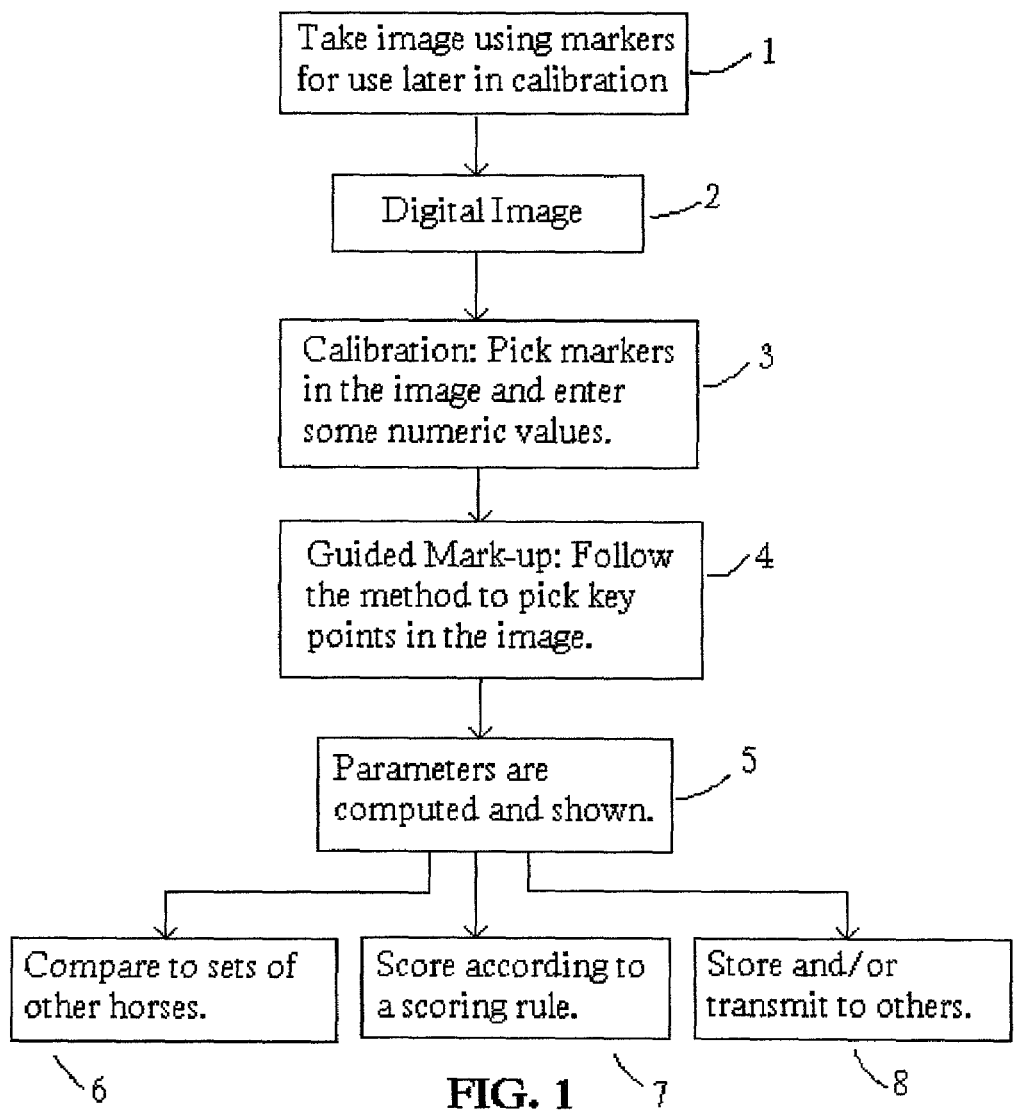
FIG. 1 is a flowchart showing the steps in accordance with a preferred embodiment of the present invention.

FIG. 1 is a flow diagram which shows the major steps of the a preferred method of the present invention. The first step 1 comprises taking a radiograph or photograph (or other type of digitizable image) including various possible embodiments of 'scale marker' apparatus in the image for later use. The result of this first step 1 is a digital image 2 which may include a scale marker. In alternate embodiments, a scale marker is not used. In such cases the method may generate less data than preferred embodiments which employ scale markers. When scale markers are not present, parameters are generated which measure angles and ratios of lengths. In order to provide more accurate length measurements, it is preferable to us scale markers in the image. In a most preferred embodiment, the steps of the method labeled 3 through 8 in FIG. 1 are realized by means of a computer software implementation. This software provides a graphical user interface (GUI) to guide the user through the method, as well as to perform the geometrical algorithms and other procedures required to implement the method of the invention.

Taking Images Containing Scale Markers

Figure 2:
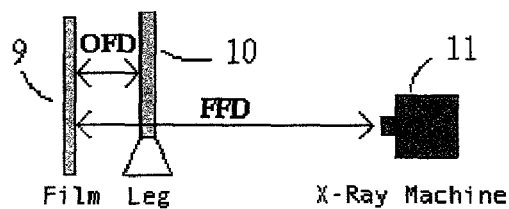
FIG. 2 is a schematic illustration showing the relationship between X-ray machine, the subject (e.g., a horse leg and hoof) and the X-ray sensitive film. The distances between film and subject, the Object-Film Distance (OFD) and between film and X-ray source, the Film-Focal Distance (FFD) affect the 'magnification' inherent in the resulting image. In a preferred embodiment, when the resulting analog film is digitized, a scale marker (an object of known size) is placed in the image on the film.

FIG. 2 shows schematically the arrangement employed in a typical case of taking a radiograph of the lower leg and hoof of a horse. The film 9 is generally placed close to the leg of the horse 10 so as to minimize the distance between the two (OFD). This corresponds to standard veterinary practice. This distance the X-ray machine 11 is from the film 9 depends on the capabilities of the X-ray machine. Generally speaking, a more powerful machine can be placed further from the film. In standard practice, a veterinarian generally develops a habit of use, and uses a fixed distance (FFD) for most radiographs. Our preferred embodiment provides a user interface in which to enter the values employed for OFD and FFD for each image taken. These values are used in the algorithm which provides for accurate length measurements for the center of the bone column. Although there are different embodiments for adding a scale marker to the radiograph image, our preferred embodiment is to photograph the radiographic film with a digital camera while the film is placed on a back-lit light box, and while doing so, place an opaque object of know dimension on the light box. The result is a digital image 2 which includes a scale marker of known size. This preferred embodiment provides a user interfaces which prompts the user to pick two points a known distance d apart on the scale marker. Given this distance d, and knowing the number of pixels in the image between the two picked points, n, we combine that information with the values OFD and FFD to compute a scale factor, f, given by the formula:

$$f = (FFD/(OFD+FFD))(d/n)$$

This value, f, is the effective length per pixel that may be used to compute lengths which are accurate for the center of the bone column. For purposes of this disclosure, center of the bone column means the plane which is parallel to the film, but offset by OFD and hence lies in the center of the leg and hoof of the horse. It is in this plane that measurements are computed. The equation above represents a magnification factor which is apparent in all radiographs taken by the current art. As FFD becomes large, and/or OFD becomes small, the magnification effect diminishes.

Another portion of this preferred embodiment relates to placing a few metal markers on or near the hoof when imaging a radiograph. The metal, which blocks X-rays, forms highly visible marks in the image. In this preferred embodiment, a metal strip is placed on the ground (or a block) on which the horse stands. This will allow us to see clearly the orientation of the ground in the image. Similarly, we place a metal strip on the dorsal hoof wall when taking a lateral radiograph. We place this metal marker so that the upper portion of it terminates just at the coronary band, the location where the hair of the leg meets the top of the hoof wall. The presence of this piece of metal will make the location of the coronary band apparent in the radiograph.

Figure 3:
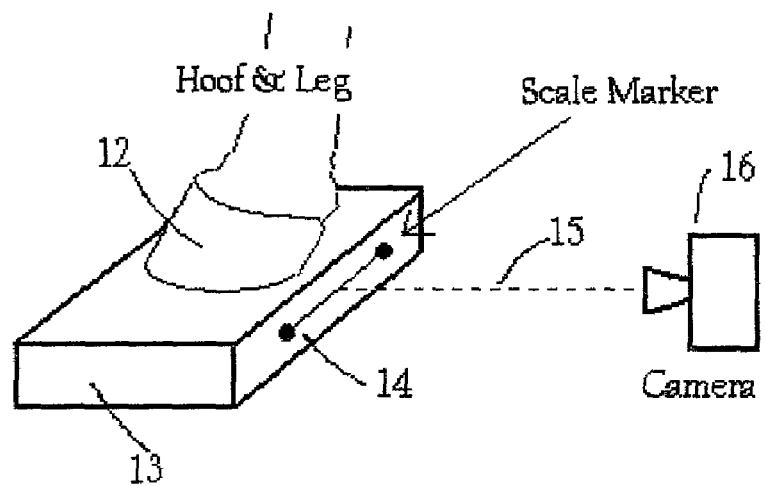
FIG. 3 is a schematic drawing showing a set of relationships for taking a photograph of the exterior of the hoof. A scale marker (an object of known size) is placed in the image such that it lies in a plane that is perpendicular to the pointing direction of the camera.
Figure 4:
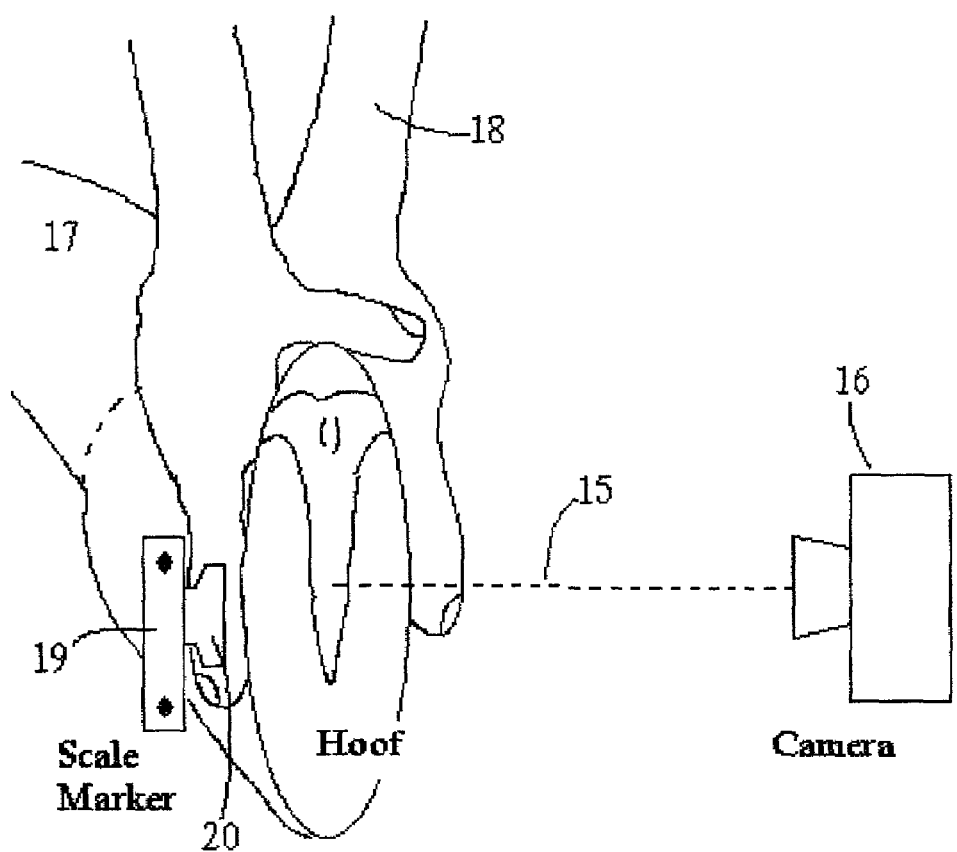
FIG. 4 is a schematic drawing showing the use of a scale marker when taking a photograph of the hoof from the solar aspect. In this case, while one person holds the hoof off the ground, a second person uses the camera to take the photograph. One embodiment of a scale marker for such a situation is a small scale that can be conveniently clamped onto one of the holder's fingers while the picture is taken. The orientation of the scale marker is positioned so that it lies in the plane of the sole of the foot.
Figure 5:
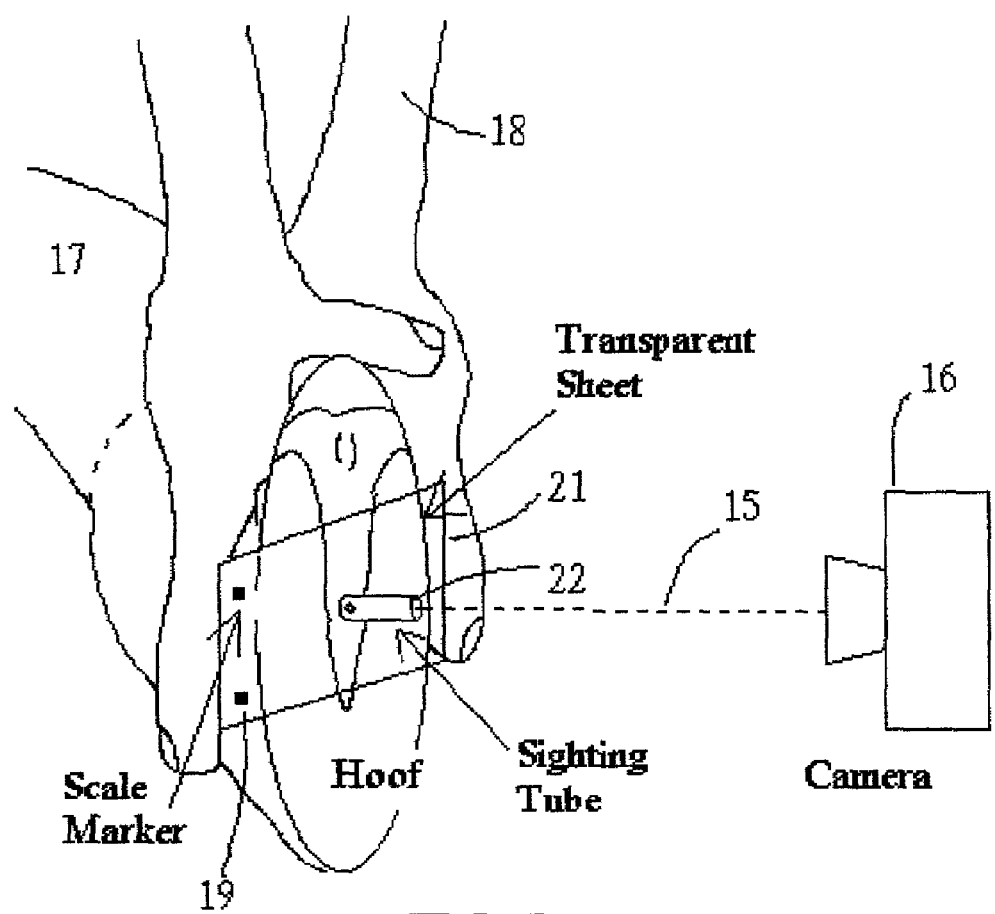
FIG. 5 is a schematic drawing of another embodiment of a scale marker to be used when taking a photograph of the sole of the horse's foot. This device is comprised of a transparent sheet with a hollow cylindrical tube mounted to it perpendicularly. Viewing down the tube from the direction the photograph is taken, the photographer can see a red target dot which indicates that the camera pointing direction is perpendicular to the plane of the transparent sheet. In practice, the transparent sheet is held against the bottom of the horse's hoof so that this 'sighting tube' will as a result be perpendicular to the plane of the sole of the foot. A scale marker (object of known length) is added to a portion of the transparent sheet.

Various embodiments of scale markers for use in photographs of the equine hoof are shown in FIG. 3 through FIG. 5. In FIG. 3, a scale marker is formed by placing two dots a known distance apart 14 on a block 13 on which the horse stands while the hoof is photographed from the lateral viewpoint. The hoof 12 should be positioned so that its major axis is aligned with the edge of the block which contains the scale marker. The camera 16 is positioned so that when the image is taken, the pointing direction 15 of the camera is perpendicular to the scale marker and the major axis of the hoof.

For use in taking a solar photograph of the horse's hoof, as in FIG. 4, a small scale marker 19 is used which can be conveniently clamped 20 onto a finger of the person 18 holding the horse's hoof during photographing. Again, the scale marker 19 is simply two dots separated by a known distance. For this view of the hoof, the scale marker should be positioned so that it lies in the plane of the hoof sole. The camera 16 should be aimed so that its pointing direction 15 is perpendicular to the plane of the sole, which is also the plane containing the scale marker.

FIG. 5 shows another preferred embodiment for taking an accurately scaled photograph of the solar view of the equine hoof. In this embodiment, a sheet of some rigid, transparent material 21 is held against the sole of the hoof. Attached perfectly perpendicularly to this sheet is a 'sighting tube' 22 which is hollow and which has a dot at the base of it on the inside. This simple apparatus provides the photographer a means to know that the camera pointing direction 15 is aligned perpendicular to the plane of the sole of the foot. If the dot at the base of the sighting tube can be seen through the camera's viewfinder, the camera 16 is aligned properly. A scale marker 19 consisting of two dots a known distance apart is placed on this same transparent sheet. The sheet is transparent so that it does not block any of the details of interest on the sole of the foot.

Although not depicted in a figure, an alternate embodiment to that shown in FIG. 3 can be imagined using a 'sighting tube' similar to that shown in FIG. 5. In this way, one is assured that the camera is in proper alignment with the subject when the image is captured.

Figure 6:
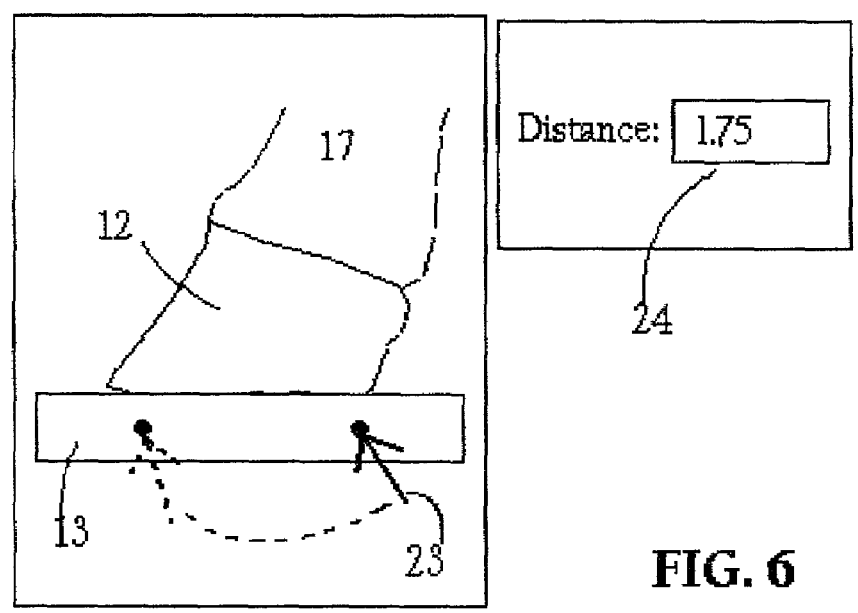
FIG. 6 is a schematic drawing showing a computer interface in which the user is prompted to pick two points on the scale marker and type the known distance between them into a field of the graphical user interface.

Although preferred embodiments of the present invention implement software programs which include, among other elements, a graphical user interface (GUI) which prompts the user for key information, and displays various results to the user, other means of practicing the invention are contemplated. FIG. 6 schematically shows a portion of the GUI in which the user is prompted to pick two points 23 which are on the scale marker and are a known distance apart. The user is further prompted to type in the value 24 of the distance between the points. This figure shows, as an example, the lateral view of the hoof, but a similar GUI exists for each of the image types (radiograph or photograph) and views (lateral, frontal, solar).

Guided Mark-up for the Lateral X-Ray of the Equine Digit

Figure 7:
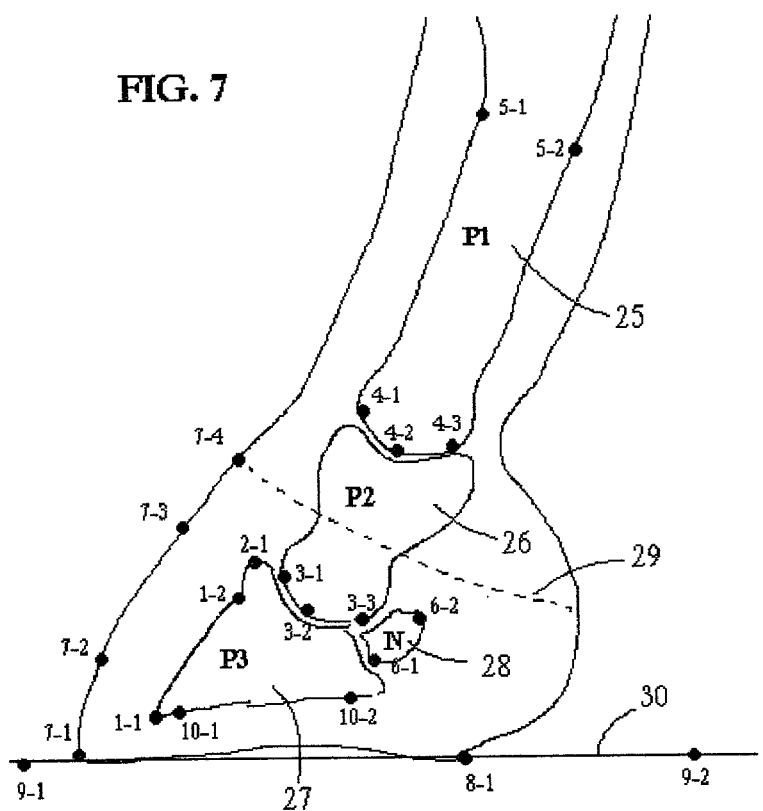
FIG. 7 is a schematic drawing showing the points which the method prescribes for the user to pick with a graphical pointing device (e.g., a 'computer mouse') on the computer screen. These 10 sets of one or more points comprise the "guided mark-up" for the lateral X-ray of the equine digit.

In the case of the lateral radiograph of the equine digit, FIG. 7 shows schematically certain key points from which the user is prompted to pick with a pointing device. The user is prompted and guided, one step at a time to pick a total of ten markers for this particular image. Each of these markers consists of about one to four discrete points that are picked by the user (typically using a computer mouse). The major bones of the equine digit are called P1, P2, P3, and the Navicular bone.

In a preferred embodiment, the user is first prompted to pick the points labeled 1-1 and 1-2 in FIG. 7. These two points form the first marker. The user is instructed to pick point 1-1 at the tip of P3 as seen in this view. The user is instructed to pick point 1-2 in the shallow valley apparent on the dorsal surface of P3 just below a prominence called the extensor process. The purpose of the two points forming marker 1 is to assign an orientation to the bone P3. For example, later a computed parameter will be the angle that the line segment between 1-1 and 1-2 makes with the ground. In the preferred embodiment, the user is prompted to make these picks by means of textual instructions but also icons and other graphical cues to indicate what is to be picked. At each step of this Guided Mark-Up procedure, additional help instructions are also provided.

The second marker may consist of one point, 2-1, which the user is instructed to pick at the top of the prominence known as the extensor process.

The third marker may consist of three points 3-1, 3-2, and 3-3 which are picked on the distal end of P2 which is approximately locally circular at that location.

The fourth marker may consist of three points 4-1, 4-2, and 4-3 which are picked on the distal end of P1 which is approximately locally circular at that location.

The fifth marker may consist of 5-1 and 5-2 which the user is guided to pick in order to aid in determining the orientation of P1 in the image.

The sixth marker may comprise points 6-1 and 6-2, marks the widest part of the navicular bone as imaged from this viewpoint.

The seventh marker may use four points, 7-1, 7-2, 7-3, and 7-4 to indicate the approximate shape of the dorsal hoof wall. In our technique, point 7-1 is usually at ground level 30, and point 7-4 is at the coronary band 29, with the other two points being placed so that the resulting piecewise-linear curve connecting the four points creates a reasonable approximation of the shape of the front hoof wall. Other embodiments could use more or fewer points in forming this approximation to the actual shape.

The eight marker may consist of just one point, 8-1, which indicates the rear-most point of support of the hoof at the heel.

The ninth marker may consist of two points, 9-1 and 9-2, which indicate the level of the ground or object the horse was standing on.

Finally, the tenth marker may consist of two points, 10-1 and 10-2, which are used to indicate the orientation of the underside of P3 relative to the ground.

In a later discussion of this description, the points that comprise these approximately ten markers and how they are used to calculate a total of 22 biomechanical parameters will be described.

Guided Mark-up for the Frontal X-Ray of the Equine Digit

Figure 8:
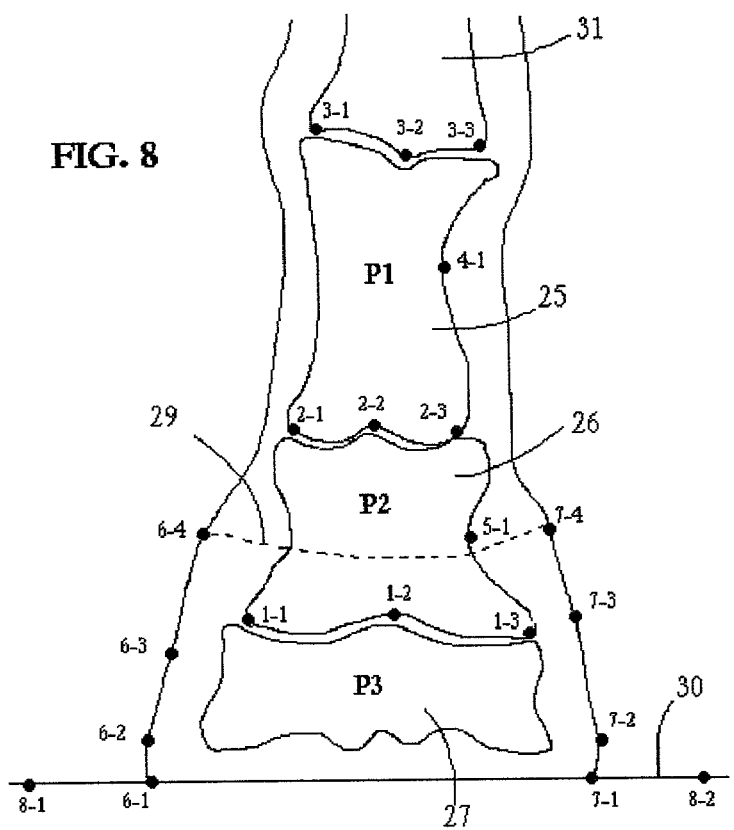
FIG. 8 is a schematic drawing showing the points which the method prescribes for the user to pick with a graphical pointing device (e.g., a 'computer mouse') on the computer screen. These 8 sets of one or more points comprise the "guided mark-up" for the frontal X-ray (i.e., Dorsal-Palmer or Anterior-Posterior X-ray) of the equine digit.

FIG. 8 shows schematically the points that the user is prompted to pick during the Guided Mark-Up phase. For this image, variously known as the frontal or anterior-posterior or dorsal-palmar view of the digit, a total of eight markers are usually employed. Each marker consists of from about one to four discrete points.

Details of the standard practice employed by veterinarians vary somewhat for this particular view of the foot. A preferred embodiment employs radiographs taken with the film positioned in a vertical upright orientation, and with the pointing direction of the X-ray machine approximately parallel to the ground. (In certain other practices, the pointing direction of the machine is inclined as much as 30 to 40 degrees relative to the ground, with the film tilted back by a similar angle.)

In a preferred embodiment, the user is prompted to pick all the points shown in FIG. 8. For example, points 1-1, 1-2, and 1-3 together form the first marker, which indicates the position, orientation, and width of the joint between bones P2 and P3. The fourth marker is a single point 4-1 chosen at the narrowest part of the P1 bone—that is, the point closest to the central axis of that bone. Likewise, the fifth marker is a single point 5-1 chosen at the narrowest point, or point closest to the central axis, of bone P2.

In a later section of this description, it will be described how the points that comprise these eight markers are used to calculate a total of 15 biomechanical parameters.

Other Radiographic Views of the Horse

While our presently described preferred embodiment does not define Guided Mark-Up and the corresponding parameters that might be used in other radiographic views of the horse, clearly such embodiments could be implemented. Such embodiments of our method would include, but not be limited to, radiographic views of the spine, neck, head, jaws, teeth, and upper legs (stifles, hocks, and hips).

Guided Mark-up for the Solar Photograph of the Equine Digit

Figure 9:
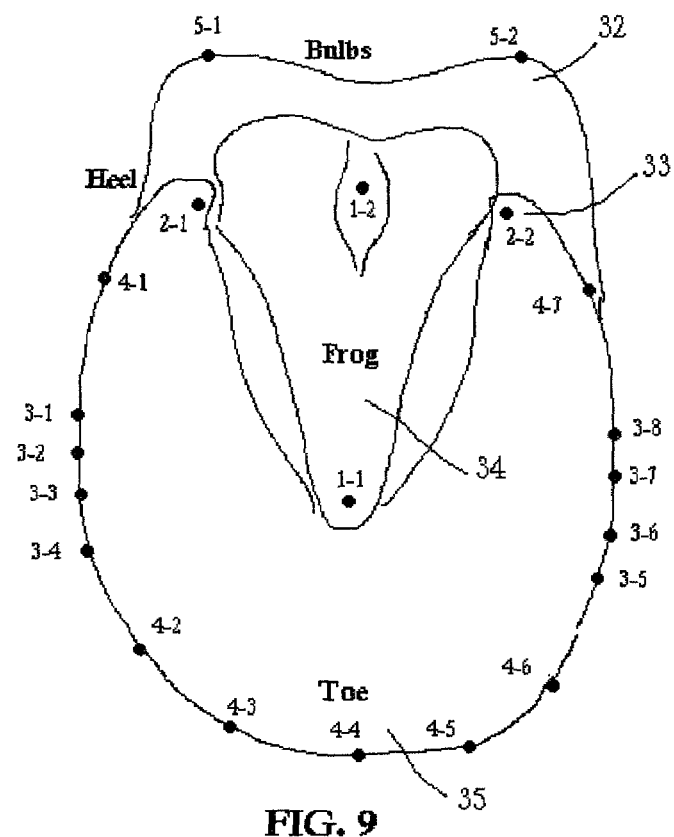
FIG. 9 is a schematic drawing showing the points which the method prescribes for the user to pick with a graphical pointing device (e.g., a 'computer mouse') on the computer screen. These 5 sets of one or more points comprise the "guided mark-up" for the solar photograph of the equine digit.

FIG. 9 shows schematically the view as seen in a photograph of the solar aspect of the equine hoof. In our preferred embodiment, a total of five markers are employed, where each marker consists of from at least two to eight points.

The user is prompted to pick two points, 1-1 and 1-2, in order to form the first marker. These points are picked to establish a reference line which evenly divides the sole structure known as the frog 34. The user is instructed to pick point 1-1 near the tip of the frog. The second marker consists of two points, 2-1 and 2-2, which indicate the rear-most points where the hard horny hoof wall touches the ground, called the heel support points.

Based on the line connecting points 1-1 and 1-2, four parallel lines are constructed which are substantially perpendicular to the 1-1 to 1-2 line, and located in the vicinity of point 1-1. The user is then asked to pick the eight points (3-1 thru 3-8) where these four parallel lines cross the outer hoof wall. The use of such guidance lines is one of the techniques employed in a preferred embodiment.

Guidance lines are again constructed to instruct the user how to pick the fourth marker. In this case, seven lines are radiated from a point lying on the 1-1 to 1-2 line at the point which was determined to be the widest part of the foot (from the third marker). The user is instructed to pick the points 4-1 through 4-7 where these points cross the outer hoof wall. The guidance lines are so constructed such that: point 4-4 lies on the frog axis at the toe 35 of the foot. Points 4-3 and 4-5 are the radial projection of the heel points (2-1 and 2-2 through the point on the frog axis at the widest part of the foot. Points 4-1, 4-2, 4-6, and 4-7 are picked on guidance lines which are meant to place these points in regions of the outer circumference of the hoof wall not previously marked.

Finally, the fifth marker consists of about two points, 5-1 and 5-2, which mark the rear-most extent of structures called the bulbs at the rear of the foot. In a later section of this description, how the points that comprise these five markers are used to calculate a total of 14 biomechanical parameters will be described.

Guided Mark-up for the Lateral Photograph of the Equine Digit

Figure 10:
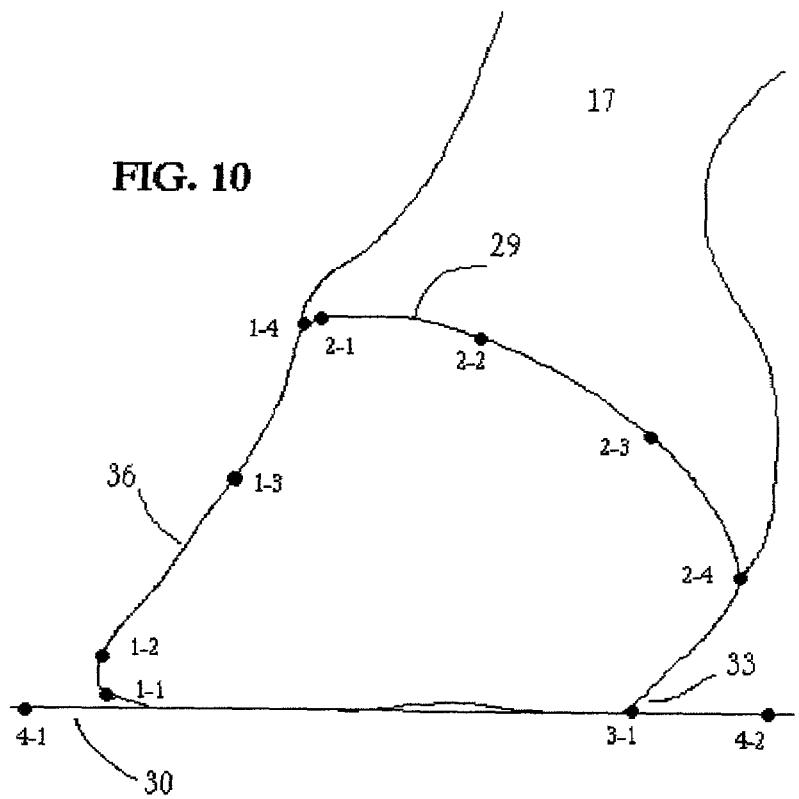
FIG. 10 is a schematic drawing showing the points which the method prescribes for the user to pick with a graphical pointing device (e.g., a 'computer mouse') on the computer screen. These 4 sets of one or more points comprise the "guided mark-up" for the lateral photograph of the equine digit.

FIG. 10 shows schematically the lateral photographic view of the exterior of the equine hoof. This view is useful for recording and studying the shape of the dorsal hoof wall 36 as well as the height and angle at the heel 33. The user is prompted to specify a total of about four markers, each consisting of about one to four discrete points.

The first marker consists of about four points which, taken together, form an approximation to the shape of the dorsal wall of the hoof. Point 1-1 is at ground level, point 1-4 is at the coronary band, and the other two points (1-2 and 1-3) are picked by the user so that the resulting piecewise-linear curve best approximates the shape of the hoof wall. Other embodiments might use more or less points to specify the shape of the dorsal wall. The second marker consists of four points (2-1 through 2-4) which together give the approximate shape of the coronary band 29 in this view. The third marker consists of just one point 3-1 used to indicate the rear-most support point at the heel. Finally, the fourth marker consists of two points and is used to specify the ground plane 30. In a later section of this description, how the points that comprise these four markers are used to calculate a total of 7 biomechanical parameters will be described.

Guided Mark-up for the Frontal Photograph of the Equine Digit

Figure 11:
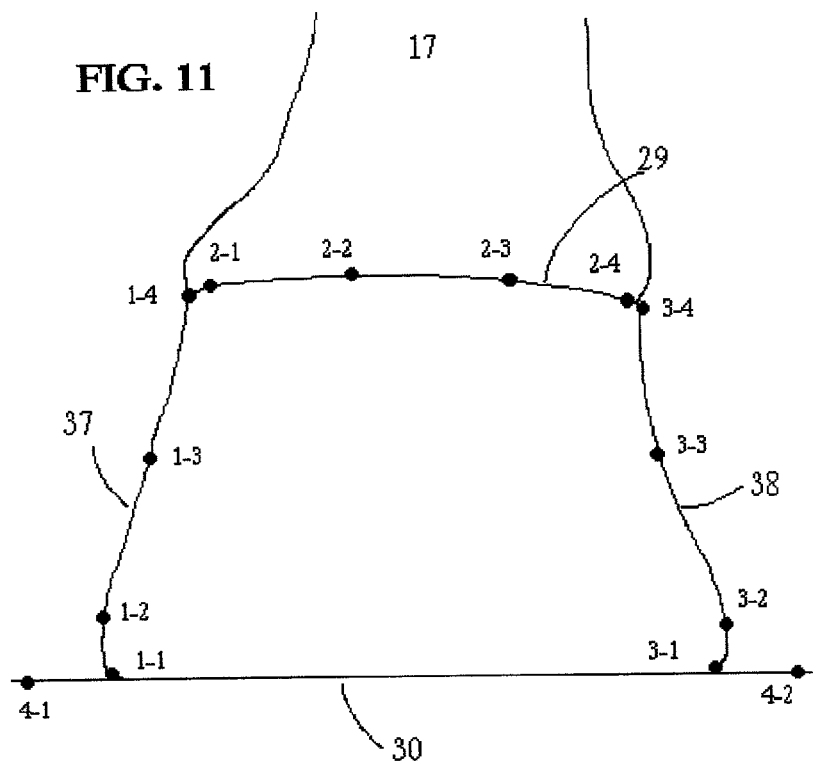
FIG. 11 is a schematic drawing showing the points which the method prescribes for the user to pick with a graphical pointing device (e.g., a 'computer mouse') on the computer screen. These 4 sets of one or more points comprise the "guided mark-up" for the frontal (i.e., dorsal) photograph of the equine digit.

FIG. 11 shows schematically the frontal (or dorsal) photographic view of the exterior of the equine hoof. This view is useful for recording and studying the shape of the lateral and medial hoof walls 37, 38. The user is prompted to specify a total of four markers, each consisting of from two to four discrete points.

The first marker may consist of four points which taken together form an approximation to the shape of the side wall of the hoof. Point 1-1 is at ground level, point 1-4 is at the coronary band, and the other two points (1-2 and 1-3) are picked by the user so that the resulting piecewise-linear curve best approximates the shape of the hoof wall. Other embodiments might use more or less points to specify the shape of the wall. The second marker consists of four points (2-1 through 2-4) which together give the approximate shape of the coronary band 29 in this view.

The third marker may consist of four points which taken together form an approximation to the shape of the other side wall of the hoof. Point 3-1 is at ground level, point 3-4 is at the coronary band, and the other two points (3-2 and 3-3) are picked by the user so that the resulting piecewise-linear curve best approximates the shape of the hoof wall. Other embodiments might use more or less points to specify the shape of the wall.

Finally, the fourth marker may consist of two points and is used to specify the ground plane 30.

In a later section of this description we will describe how the points that comprise these four markers are used to calculate a total of 8 biomechanical parameters.

Parameters of the Lateral X-Ray of the Equine Digit

Figure 12:
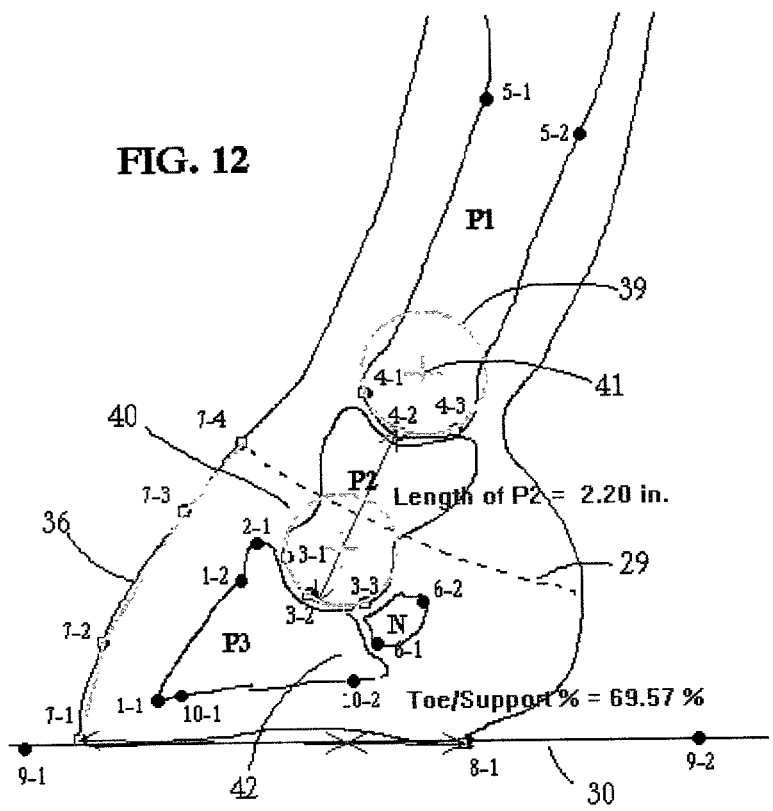
FIG. 12 is a schematic drawing of an example of some of the biomechanical parameters computed from the Guided-Mark-Up picks. A preferred embodiment of the method computes a total of 22 parameters for the lateral digit X-ray, while this schematic drawing only shows two as an example.

Our method defines and computes a total of 22 parameters for the lateral X-Ray of the equine digit. As an example, FIG. 12 shows two such parameters in a graphic display overlaid on the original image. These two example parameters are:

"Length of P2" is defined as follows: Using known planar geometry, construct a circle which uniquely passes through the three points of marker number three (3-1, 3-2, and 3-3). Likewise, construct a circle through the points of marker number four (4-1, 4-2, and 4-3). Take the distance between the centers of these two circles, and subtract the radius of the circle associated with marker number four, and add the radius of the circle associated with marker number three.

"Toe/Support %" is defined as follows: Using known planar geometry, construct a line which passes through the center of the circle associated with marker number three and is perpendicular to the line formed through the points of marker number nine (9-1 and 9-2). Relative to the location where this constructed line intersects the line through 9-1 and 9-2, the percentage of the distance between points 7-1 and 8-1 which lies on the 'toe' side (towards point 7-1) is this parameter.

Referring to FIG. 12, the remaining parameters for this image type and view are:

"Length of P3" is defined as follows: The distance from the center of the circle associated with marker number three to the tip of P3 at point 1-1, minus the radius of the circle associated with marker number three.

"P2/P3-Joint Radius" is defined as follows: The radius of the circle associated with marker number three.

"P1/P2-Joint Radius" is defined as follows: The radius of the circle associated with marker number four.

"Navicular Width" is defined as follows: The distance between the points 6-1 and 6-2.

"P3 Descent" is defined as follows: The vertical (relative to line of 9-1 and 9-2) distance from point 7-4 and point 2-1.

"P3 Angle" is defined as follows: The angle formed between the line defined by points 1-1 and 1-2, and the line defined by points 9-1 and 9-2.

"P3 Distance to Ground" is defined as follows: The minimum distance between the point 1-1 and the line defined by points 9-1 and 9-2.

"P3 Distance to Toe" is defined as follows: Project the point 1-1 vertically downward onto the line defined by 9-1 and 9-2. From the point so-defined, the distance to point 7-1.

"P2/P3-Joint Height" is defined as follows: The length of the line segment which begins at the center of the circle associated with marker number three and meets the line specified by points 9-1 and 9-2 perpendicularly, minus the radius of the circle associated with marker number three.

"Navicular Angle" is defined as follows: The angle formed between the line defined by points 6-1 and 6-2, and the line defined by points 9-1 and 9-2.

"Support Length" is defined as follows: The distance between points 7-1 and 8-1.

"Functional Hoof Angle." is defined as follows: The angle formed between the line defined by points 1-1 and 7-4, and the line defined by points 9-1 and 9-2.

"Hoof Angle" is defined as follows: The angle that a physical device would measure between the ground (the line defined by 9-1 and 9-2) and the front of the hoof wall, when the length of the physical apparatus is such that it reaches just up to point 7-4 at the coronary band 29. In this geometrical situation, the line defining the 'front wall' for the purpose of this measurement would always contact point 7-4, and would additionally contact one or more of points 7-1, 7-2, and 7-3.

"Hoof Deviation" is defined as follows: The deviation from a perfect straight line and the piecewise-linear curve formed by the connection of points 7-1 through 7-4. At each of this points we compute a distance between the point and the straight line, and we sum the values.

"Hoof/P3 Distance" is defined as follows: The distance between the straight line at the dorsal hoof wall as described in the "Hoof Angle" parameter, and the center of the line segment joining points 1-1 and 1-2.

"Hoof/P3 Angle Difference" is defined as follows: The angular difference between the previously described "P3 Angle" parameter and the "Hoof Angle" parameter.

"Dorsal Length" is defined as follows: The length of the line segment at the dorsal hoof wall as described in the "Hoof Angle" parameter description.

"P3 Bottom Angle" is defined as follows: The angle formed between the line defined by points 10-1 and 10-2, and the line defined by points 9-1 and 9-2.

"P2/P3-Joint Angle" is defined as follows: Define reference line segment "A" as follows: a line segment beginning at the center of the circle associated with marker number three, and parallel to the line defined by points 1-1 and 1-2, descending down towards the sole of the foot. Define reference line segment "B" as follows: beginning at the center of the circle associated with marker number four, and going thru the center of the circle associated with marker number three, and extend some distance beyond that center. This parameter is the angle formed between reference "A" and reference "B" measured in the counter-clockwise sense.

"P1/P2-Joint Angle" is defined as follows: Define reference line segment "C" as follows: beginning at the midpoint of the line segment defined by points 5-1 and 5-2, proceed thru the center of the circle associated with marker number four, and extend some distance beyond that center. This parameter is the angle formed between reference "C" and reference "B" measured in the counter-clockwise sense.

Parameters of the Frontal X-Ray of the Equine Digit

Figure 13:
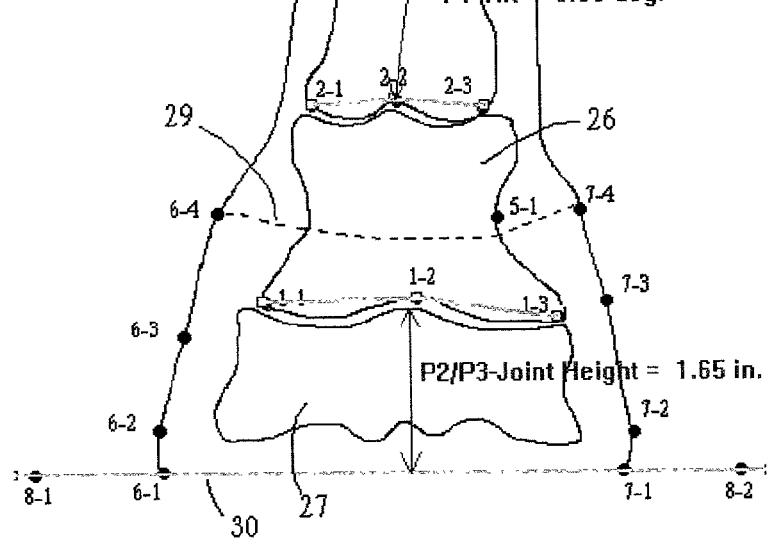
FIG. 13 is a schematic drawing of an example of some of the biomechanical parameters computed from the Guided-Mark-Up picks. A preferred embodiment of the method computes a total of 15 parameters for the frontal digit X-ray, while this schematic drawing only shows two as an example.

Our method defines and computes a total of 15 parameters for the frontal X-Ray of the equine digit. As an example, FIG. 13 shows two such parameters in a graphic display overlaid on the original image. These two example parameters are:

"P1 Tilt" is defined as follows: The angle formed between the line defined by points 3-1 and 3-3, and the line defined by points 2-1 and 2-3. Based on which hoof of the horse the algorithm is applied to, the positive sense for this angle is defined such that a positive angle cants the top of P1 inward toward the body of the horse relative to the bottom of P1.

"P2/P3-Joint Height" is defined as follows: The minimum distance between the midpoint of the line segment defined by points 1-1 and 1-3 and the line defined by points 8-1 and 8-2.

Referring to FIG. 13, the remaining parameters for this image type and view are:

"P2/P3-Joint Width" is defined as follows: The distance between points 1-1 and 1-3.

"P1/P2-Joint Width" is defined as follows: The distance between points 2-1 and 2-3.

"F/P1 -Joint Width" is defined as follows: The distance between points 3-1 and 3-3.

"P2 Tilt" is defined as follows: The angle formed between the line defined by points 2-1 and 2-3, and the line defined by points 1-1 and 1-3. The positive sense is defined in a manner analogously to the of the "P1 Tilt" parameter.

"P1 Minimum Half-Width" is defined as follows: Define the "center line of P1" by forming the line connecting the midpoints of the line segment defined by points 3-1 and 3-3, and the line segment defined by points 2-1 and 2-3. This parameter is the minimum distance between this "center of P1" and the point 4-1.

"P2 Minimum Half-Width" is defined as follows: Define the "center line of P2" by forming the line connecting the midpoints of the line segment defined by points 2-1 and 2-3, and the line segment defined by points 1-1 and 1-3. This parameter is the minimum distance between this "centerline of P1" and the point 5-1.

"P2/P3-Joint Tilt " is defined as follows: The angle formed between the line defined by points 1-1 and 1-3, and the line defined by points 8-1 and 8-2. The positive sense is defined in a manner analogously to the method described for parameters "P1 Tilt".

"Outer Wall Angle" is defined as follows: The angle a physical hoof-gauge would make if used to measure the angle between the line defined by points 8-1 and 8-2, and the outer hoof wall as defined by the four points 6-1 through 6-4. Depending on the relative location of the four points of marker six, a line segment is constructed, called the "outer wall line" which touches point 6-4 and one or more of the other points in marker six.

This parameter is the angle formed between the "outer wall line" and the ground (defined by points 8-1 and 8-2).

"Outer Wall Deviation" is defined as follows: The distance of each of the points in marker number six (points 6-1 through 6-4) is measured to the "outer wall line" described above. These distance values are summed to compute this parameter.

"Outer Wall Length" is defined as follows: The length of the "outer wall line" described above.

"Inner Wall Angle" is defined as follows: The angle a physical hoof-gauge would make if used to measure the angle between the line defined by points 8-1 and 8-2, and the inner hoof wall as defined by the four points 7-1 through 7-4. Depending on the relative location of the four points of marker seven, a line segment is constructed, called the "inner wall line" which touches point 7-4 and one or more of the other points in marker seven. This parameter is the angle formed between the "inner wall line" and the ground (defined by points 8-1 and 8-2).

"Inner Wall Deviation" is defined as follows: The distance of each of the points in marker number seven (points 7-1 through 7-4) is measured to the "inner wall line" described above. These distance values are summed to compute this parameter.

"Inner Wall Length" is defined as follows: : The length of the "inner wall line" described above.

Parameters of the Solar Photograph of the Equine Digit

Figure 14:
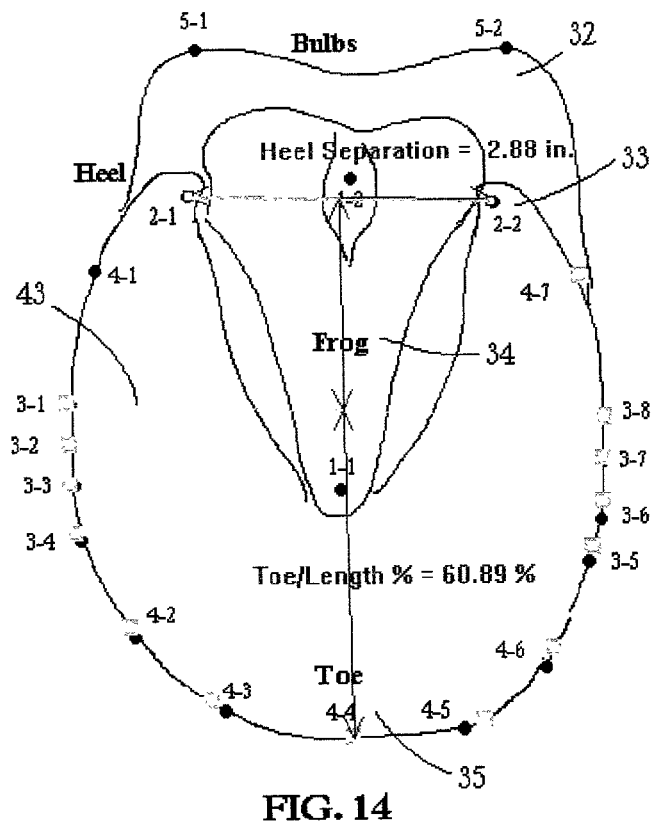
FIG. 14 is a schematic drawing of an example of some of the biomechanical parameters computed from the Guided-Mark-Up picks. A preferred embodiment of the method computes a total of 14 parameters for the solar photograph, while this schematic drawing only shows two as an example.

Our method defines and computes a total of 14 parameters for the solar photograph of the equine digit. As an example, FIG. 14 shows two such parameters in a graphic display overlaid on the original image. These two example parameters are:

"Heel Separation" is defined as follows: The distance between the points 2-1 and 2-2.

"Toe/Length %" is defined as follows: First we compute the "widest part of the foot" which is the larger of the following four distances: between 3-1 and 3-8, between 3-2 and 3-7, between 3-3 and 3-6, or between 3-4 and 3-5. Define the point "M" where the line defin by points 1-1 and 1-2 intersects the line described as the "widest part of the foot" as above. This parameter is the ratio of the distance from "M" to point 4-4 expressed as a percentage of the distance from the midpoint of the line segment defined by 2-1 and 2-2 to the point 4-4.

Referring to FIG. 14, the remaining parameters for this image type and view are:

"Frog Angle" is defined as follows: The angle formed between the line defined by the points "M" (described above) and 2-1, and the line defined by the points "M" and 2-2. The angle is computed so as to always be a positive number.

"Foot Length" is defined as follows: The distance from the midpoint of the line segment defined by points 2-1 and 2-2, and the point 4-4.

"Foot Width" is defined as follows: The widest part of the foot, as described for the "Toe/Length %" parameter above.

"Foot Circumference" is defined as follows: The length of the piecewise-linear curve formed by the ordered connection of the following points: 2-1, 4-1, 3-1, 3-2, 3-3, 3-4, 4-2, 4-3, 4-4, 4-5, 4-6, 3-5, 3-6, 3-7, 3-8, 4-7, 2-2, and back to 2-1.

"Foot Radius" is defined as follows: Given the "Foot Circumference" as defined above, and making the simplification that the shape of the foot is approximately circular, compute a radius corresponding to the circumference.

"Foot Area" is defined as follows: Approximating the shape of the foot as a circle, and using the value of radius as defined above, compute the surface area of this circle.

"Inside/Width %" is defined as follows: The distance from the point "M" (defined above) over to the point on the "inside" (medial) side of the hoof which defines one end of the "widest part of the foot" , expressed as a percentage of the "Foot Width" parameter.

"Heel/Width %" is defined as follows: The "Heel Separation" parameter expressed as a percentage of the "Foot Width" parameter.

"Heel-Bulb Distance" is defined as follows: The minimum distance between the midpoint of the line segment defined by points 5-1 and 5-2, and the line segment defined by points 2-1 and 2-2.

"Heel-Bulb/Length %" is defined as follows: The value of the "Heel-Bulb Distance" parameter expressed as a percentage of the "Foot Length" parameter.

"Frog/Heel Angle" is defined as follows: The angle formed between the line defined by points 1-1 and 1-2, and the line defined by points 2-1 and 2-2. Depending on the hoof, the positive sense is defined such that an angle less than 90 degrees would tend to be caused by the "inner" heel support point being ahead of the "outer" heel support point.

"Frog/Toe Angle" is defined as follows: The angle formed between the line defined by points 1-1 and 1-2, and the line defined by points 4-3 and 4-5. Depending on the hoof, the positive sense is defined such that an angle less than 90 degrees would tend to be caused by the "inner" toe support point being ahead of the "outer" toe support point.

Parameters of the Lateral Hoof Photograph of the Equine Digit

Our method defines and computes a total of 7 parameters for the lateral photograph of the equine digit. As an example, FIG. 15 shows two such parameters in a graphic display overlaid on the original image. These two example parameters are:

"Hoof Angle" is defined as follows: The angle that a physical device would measure between the ground (the line defined by 4-1 and 4-2) and the front of the hoof wall, when the length of the physical apparatus is such that it reaches just up to point 1-4 at the coronary band 29. In this geometrical situation, the line segment we will call the "front wall line" for the purpose of this measurement would always contact point 1-4, and would additionally contact one or more of points 1-1, 1-2, and 1-3.

"Heel Height" is defined as follows: The minimum distance between the point 2-4 and the line defined by points 4-1 and 4-2.

Referring to FIG. 15, the remaining parameters for this image type and view are: "Hoof Deviation" is defined as follows: The distance individually between each of the four points in marker number one and the "front wall line" defined above are computed and summed to compute this parameter.

"Dorsal Length" is defined as follows: The length of the "front wall line" defined above. "Heel Angle" is defined as follows: The angle formed by the line defined by the points 3-1 and 2-4, and the line defined by the points 4-1 and 4-2. Always a positive angle.

"Support Length" is defined as follows: The distance between the lower point defining the "front wall line" and point 3-1.

"Heel/Toe Height %" is defined as follows: The "Heel Height" parameter expressed as a percentage of the minimum distance between point 1-4 and the line defined by points 4-1 and 4-2.

Parameters of the Frontal Hoof Photograph of the Equine Digit

Our method defines and computes a total of 8 parameters for the frontal photograph of the equine digit. As an example, FIG. 16 shows two such parameters in a graphic display overlaid on the original image. These two example parameters are:

"Outer Wall Deviation" is defined as follows: The angle that a physical device would measure between the ground (the line defined by 4-1 and 4-2) and the outer (lateral) hoof wall, when the length of the physical apparatus is such that it reaches just up to point 3-4 at the coronary band 29. In this geometrical situation, the line segment we will call the "outer wall line" for the purpose of this measurement would always contact point 3-4, and would additionally contact one or more of points 3-1, 3-2, and 3-3. This parameter is the sum of all the deviations of the points in the third marker from the "outer wall line".

"Foot Width" is defined as follows: The distance between points 1-1 and 3-1.

Referring to FIG. 16, the remaining parameters for this image type and view are: "Outer Wall Angle" is defined as follows: The angle formed between the "outer wall line" defined above and the line defined by the points 4-1 and 4-2.

"Outer Wall Length" is defined as follows: The length of the "outer wall line".

"Inner Wall Angle" is defined as follows:: The angle that a physical device would measure between the ground (the line defined by 4-1 and 4-2) and the inner (medial) hoof wall, when the length of the physical apparatus is such that it reaches just up to point 1-4 at the coronary band 29. In this geometrical situation, the line segment we will call the "inner wall line" for the purpose of this measurement would always contact point 1-4, and would additionally contact one or more of points 1-1, 1-2, and 1-3.

"Inner Wall Deviation" is defined as follows: The distances of each point individually in marker number one from the "inner wall line" are summed to compute this parameter.

"Inner Wall Length" is defined as follows: The length of the "inner wall line".

"Inner/Outer Height %" is defined as follows: The minimum distance from the point 3-4 to the line defined by points 4-1 and 4-2, expressed as a percentage of the minimum distance from the point 1-4 to the line defined by points 4-1 and 4-2. Values greater than 100% indicate that the "inner" (medial) side of the coronary band 29 is higher off the ground than the "outer" (lateral) side.

The Method of Comparing One Horse to a Comparison Set

As indicated in FIG. 17, the preferred embodiment of the method employs a graphical user interface to display the results of a comparison of one horse's parameters with those of a "Comparison Set" 51 consisting of many horses. In the display of FIG. 17, for each of the parameters 46 values 47 of the particular image kind and view under consideration, we display the minimum value 48 found amongst the Comparison Set 51 for that same parameter. Likewise, the maximum value 50 amongst the Comparison Set 51 for the same parameter is also displayed. A vertical bar 49 drawn graphically indicates visually where the current horse under consideration compares to these minimum and maximum values. In one embodiment, when the current horse's parameter value is within 10% of either the minimum or the maximum value found in the Compare Set 51, the graphical indicator is highlighted in red to alert the user that the horse under consideration is unusual compared to the group of horses represented by the Comparison Set 51.

In an alternate embodiment, rather than displaying the absolute minimum 48 and maximum 50 values in the graphical display, we rather display special values meant to describe the extent of the range of values found in the Compare Set in a more statistically meaningful way. As an example of one such statistical measure, consider fitting a Gaussian distribution curve to the data of the Compare Set for a given parameter, and then extract the mean and standard deviation of this distribution. Then, in place of the minimum value found, display the mean value minus three times the standard deviation. Likewise, in place of the maximum value found, display the mean value plus three times the standard deviation. Such a scheme would provide a more meaningful description of the compare set, especially for the case in which a large number of horses are used as a compare set.

In the preferred embodiment, the Compare Set 51 of horses to be used for these comparisons can be configured as desired. For example, one might compare the horse under consideration to a group of horses all of like breed, certain age, and of a certain height.

In another embodiment of the method, a histogram depicting the distribution of values found in the Compare Set could be displayed to the user graphically, along with a marker indicating where the horse currently under consideration lies within the histogram.

In the preferred embodiment, one form of the use of a Compare Set is to compare a given horse to itself over time. In this case, a useful embodiment is to display the data as a graph depicting the particular parameter under consideration as a function of time. In this way, trends in the various parameters over time can be readily observed.

The Method of Computing a Score Based on a Rule

FIG. 18 shows a graphical user interface that is found in our preferred embodiment. Each parameter 46 value 47 is displayed for the particular image kind and view under consideration. Associated with each parameter is a rule which is represented in the display as a phrase such as "Between X and Y" 52, or "At Most X" 55, or "At Least X" 56, or "Equal to X". These phrases describe the desirable value or range of values for the specific parameter. Also, a weighting factor 53 can be specified which indicates the relative of this particular parameter to the overall scoring of the image.

In the preferred embodiment, a graphical user interface (GUI) is available 54 so that the user may freely edit the rules to be enforced for each parameter in the computation of the overall score. An important feature of the method to compute preferred values or ranges of values for these rules is that such values or ranges need not be simply specified by a numerical value, but rather, may be specified as a function of one or more other parameter values from this image. For example, one could specify a rule that states that the preferred value of parameter "A" is 'At Most 1.5 times the Value of Parameter "B"'.

The result of applying all the individual rules for each parameter, and the associated weights is a total score 57 which is computed for how well the given image complies to the stated parameter rules. In the preferred embodiment, this score is computed as a percentage on the range from 0% to 100%, where 100% would mean perfect compliance with the rule. Other embodiments utilizing other scales are possible.

Computation of Overall Score for a Given Horse

The preferred embodiment provides for the possibility of averaging the scores from multiple images to compute an overall score for a given horse on a scale from 0% to 100%, where 100% would mean all parameters of all image kinds and views in full compliance with the stated rules. As the preferred embodiment includes the analysis of at least five image types and views for each hoof, an Overall Score could be the average of twenty or more individual image scores.

Combining Scoring and Comparison Sets for Percentile Ranking

The preferred embodiment can combine the notion of a Compare Set with the score obtained for each horse in the Compare Set in order to compute a percentile scoring of each horse in the comparison group.

Additional Tools: Databasing, Free Mark-Up, Internet Connectivity, Etc

The preferred embodiment stores all images and their associated parameters, rules, scores, and additional mark-up in a database for later retrieval.

The preferred embodiment also supports "Free Mark-Up" which allows the user to add additional notes and measurements to the image under study. Such measurements are scaled to give accurate length measurements using the same scaling method developed for the accurate computation of parameters.

The preferred embodiment contains the ability to connect to the Internet so as to be able to send and receive images and their associated parameters, scoring, and additional mark-up. This facilitates the communication amongst users of the method.

It is envisioned that the present invention is subject to many modifications which will become apparent to those of ordinary skill in the art. For example, the techniques employed by the method of the present invention are by and large applicable to other image types, such as Ultra-Sound images, MRI scans, and others, and although the preferred embodiment described contemplates only radiographs and photographs, it should not be construed to exclude a similar method on these image types. Additionally, although a horse's hoof is used throughout this description, any animal that has hoofs or other digits that are quantitatively definable and measurable, are contemplated by the present invention.

Accordingly, it is intended that the present invention not be limited to the particular embodiment illustrated herein, but embraces all such modified forms thereof as come within the scope of the following exemplary claims.

We claim:

1. A method of evaluating the conformation of an animal's hoof and lower leg comprising the steps of:
    (a) receiving digital images of the hoof and/or lower leg;
    (b) computing measurements (angles, ratios, lengths, etc) within those images;
    (c) using these measurements to make comparisons between animals, or the same animal a different points in time;
    (d) using these measurements to compute a "score" which specifies how the particular animal conforms to some ideal;
    (e) combining the scores with the comparison set in order to use the "scores" to rank the animals in percentile fashion.

2. The method of claim 1 wherein
    (a) the user is guided to pick certain key 'markers' within the image, and
    (b) biomechanical parameters are computed from the picked 'markers'.

3. The method of claim 1 wherein scale markers, visible in the image, are used to allow accurate scaling of length measurements.

4. The method of claim 1 wherein the types of images used are photographs and radiographs.

* * * * *